United States Patent [19]

Sasaki

[11] Patent Number: 5,444,233

[45] Date of Patent: Aug. 22, 1995

[54] OPTICAL OR MAGNETOOPTICAL INFORMATION RECORDING/REPRODUCING APPARATUS AND A FOCUSING PULL-IN METHOD FOR SUCH APPARATUS GENERATING A LIGHT BEAM FOR FOCUSING ERROR SIGNAL DETECTION

[75] Inventor: Kenichi Sasaki, Tokyo, Japan

[73] Assignee: Canon Kabushiki Kaisha, Tokyo, Japan

[21] Appl. No.: 111,564

[22] Filed: Aug. 24, 1993

[30] Foreign Application Priority Data

Sep. 2, 1992 [JP] Japan .................. 4-257613

[51] Int. Cl.$^6$ .............................................. G01J 1/20
[52] U.S. Cl. .................... 250/201.5; 369/54
[58] Field of Search ............ 250/201.5, 201.2; 369/44.27, 44.29, 44.32, 54, 44.37, 44.38, 121, 112

[56] References Cited

U.S. PATENT DOCUMENTS 5,293,366 3/1994 Ohta .................... 369/44.38
5,295,125 3/1994 Oonishi et al. .......... 369/44.29

FOREIGN PATENT DOCUMENTS 0206642 12/1986 European Pat. Off. .
0234594 9/1987 European Pat. Off. .
0407573 1/1991 European Pat. Off. .

OTHER PUBLICATIONS

Patent Abstracts of Japan, Abstract of Japanese Patent No. JP-A-61 142 538, vol. 10, No. 341, Publication Date: Nov. 18, 1986.

Primary Examiner—David C. Nelms
Assistant Examiner—Que T. Le
Attorney, Agent, or Firm—Fitzpatrick, Cella, Harper & Scinto

[57] ABSTRACT

An optical information recording/reproducing apparatus includes a semiconductor laser having plural light emitting parts within a chip, so that plural light spots are formed on an information recording medium to effect recording/reproduction of information and focusing error signal detection, utilizing plural light beams emitted from the plural light emitting parts. Light spots other than a light spot for the focusing error signal detection are turned off until a focusing pull-in operation is completed.

17 Claims, 8 Drawing Sheets

OPTICAL OR MAGNETOOPTICAL INFORMATION RECORDING/REPRODUCING APPARATUS AND A FOCUSING PULL-IN METHOD FOR SUCH APPARATUS GENERATING A LIGHT BEAM FOR FOCUSING ERROR SIGNAL DETECTION

BACKGROUND OF THE INVENTION

1. Field of the Invention

The present invention relates to an optical information record/reproducing apparatus for optical information recording and reproduction by optical beam irradiation, and more particularly to an optical information record/reproducing apparatus for effecting recording and reproduction in a parallel manner, utilizing plural light beams.

2. Related Background Art

In a conventional optical information record/reproducing apparatus for magnetic or magnetooptical information recording and reproduction, a verifying operation is conducted, after information recording, in order to confirm whether the information has been properly recorded. The verifying operation is usually conducted, after the information recording on an information track during a rotation of the information recording medium, by reproducing the thus recorded information during a next rotation of the recording medium. However, this method, requiring two steps for information recording, suffers from a slow recording speed, and an improvement in this respect has been desired.

Therefore, for reducing the time required for such verification and thus achieving high-speed recording, there has been proposed a direct verification method of effecting the verifying operation on real-time basis. Such direct verification is generally conducted by irradiating the information track of the information recording medium with two light spots positioned on the front and back thereof, recording the information with the preceding light spot and immediately reproducing the recorded information with the following light spot and comparing the reproduced information with the information to be recorded.

Another drawback associated with the conventional optical information record/reproducing apparatus lies in its slow data transfer rate. For resolving this drawback, there has been proposed a method of irradiating plural tracks of the recording medium simultaneously with plural light spots, thereby effecting information recording or reproduction in a parallel manner on plural tracks. Such optical information record/reproducing technology utilizing plural light spots has taken on great importance.

For forming plural light spots on the recording medium, there have been proposed various methods, including a method of dividing the light from a single light source into plural light beams by means of an optical element such as a diffraction grating, but, among such methods, considered particularly superior, is a method of utilizing plural light sources, in view of the advantage of independent intensity control of the light spots formed on the information recording medium.

In case of employing plural light sources, the optical paths are generally so designed that the plural light beams constitute a small angle therebetween and are focused, through a single objective lens, onto the information recording medium. Due to the image angles of the light beams at the entry into the objective lens, the focused points of the light beams on the recording medium are spatially separated, thereby forming plural light spots in a parallel manner. In the tracking control or focusing control, the plural light spots, being focused through a single objective lens, can be moved in the tracking or focusing direction while retaining a constant, mutual positional relationship by the movement of the objective lens in a corresponding direction. In such a configuration, the plural light spots irradiate a track or mutually separated tracks, thereby effecting information recording or reproduction in a simultaneous manner on the track or tracks. In such case the servo error signal for automatic focusing or tracking control can be obtained from the reflected light from any one of the light spots or from reflected lights from plural light spots.

Plural light sources can also be realized by a method of employing plural semiconductor laser diodes and combining light beams, for example, with half mirrors, or by employing a method of utilizing a semiconductor laser diode array.

On the other hand, in a reproducing optical system for reproducing the information by detecting the light reflected by the recording medium, the reflected light of the plural light spots have to be individually detected. In such detection, since the light beams respectively have small image angles, they have to be focused by condenser lenses for achieving spatial separation on the detector. Consequently, photodetectors are so positioned, in a divided manner, as to receive respective light beams in spatially separate focus positions, and the information is reproduced from the thus obtained detection signals.

The plural light sources may be realized, for example, as explained above, by employing plural semiconductor laser diodes and by combining the light beams thereof with suitable optical elements, such as half mirrors or dichroic mirrors. But, such a configuration is not preferable as it is significantly inferior in productivity to the optical head using a single light spot, due to the increased number of components, the increased number of positions requiring optical adjustments, and the difficulty of making optical adjustments.

Also, such a configuration is extremely susceptible to the positional aberrations, even by very small amounts, of the optical components from their adjusted states, because the positional precision between the photodetector surface and the light spot to be detected thereon has to be within a range of several microns. The use of plural semiconductor laser diodes is disadvantageous, because the number of associated components (for example collimating lens) increases with the number of such laser diodes, so that the number of independently factors leading to such positional aberrations also increases.

On the other hand, the detection optical system for detecting the servo error signal generally detects the displacement or deformation of the light spot for the focusing control with a divided photodetector as a variation in intensity, and the variation in the intensity distribution of the light spot for tracking control with a divided photodetector. In either case, however, the light spot has to be enlarged to a certain size, because the width of the dividing lines on the light-receiving face of the photodetector has a certain lower limit the (light spot diameter has to be somewhat larger than the width of the dividing lines), and in order to facilitate the positional adjustment of the photodetector. For this purpose there is, for example, employed a method of extending the focal length of the detected light condensing lens and positioning the photodetector out of the focal position of the condensing lens. However, as the plural light beams are only separated by angles as small as several minutes to several tens of seconds, the spatial separation on the photodetector becomes difficult because of interference with the adjacent light spots, if the detection is conducted at a position where the light beam diameter is relatively large.

For avoiding this difficulty it is conceivable to expand the angles of the plural light beams, but such expansion is difficult because of (1) an increased separation of the light spots on the recording medium, (2) increased aberrations due to an increased image angle at the entry into the objective lens, and (3) significantly different incident angles, among the light beams, into the dielectric film with a polarizing property.

If the recording medium is a rotating disk, the curvature of the information track is different between an outer part and an inner part of the disk. Thus, direct verifying operation is performed by irradiating the same information track with plural light spots and conforming the information, recorded by a preceding light spot, by a succeeding light spot, if the distance of the light spots is expanded as in the foregoing case (1), even when one of the light spots is properly positioned on the information track, the other tends to be displaced from the center of the information track. For this reason, it is difficult, particularly on an optical disk, to expand the distance of the light spots thereon.

In general, it is necessary to find a compromise between the above-mentioned requirements, and there is selected a configuration with a reasonably sized photodetector not requiring difficult positional adjustment and not showing significant loss in the non-sensitive portions thereof. For this reason, the light spots on such a photodetector are considerably close and are spatially separated only to a marginally acceptable level. In such a situation, the spatial separation of the light spots is realized only when the focusing servo loop is closed. But, if the recording medium is somewhat significantly defocused with respect to the objective lens, the light spot on the photodetector will also be enlarged by such defocusing, and may overlap with the adjacent light spots on the photodetector. In such a case, each divided portion of the photodetector will receive a leaking light of the adjacent light spots, whereby the proper light amount balance on the divided portions of the photodetector is destroyed and a proper focus error signal can be no longer obtained. Also the S-shaped curve of the auto focusing control is deformed, thereby leading to inconveniences such as a narrower linear range and a sudden change of S-shaped sensitivity, eventually giving rise to the following drawbacks.

At first, the pull-in of the focusing servo operation becomes difficult or impossible, depending on the magnitude of the vibration of the recording medium. Also when an external perturbation, such as a shock or a vibration induces defocusing, the S-shaped curve will be deformed due to the interference of the adjacent light spots on the photodetector, thus easily inducing, for example, an oscillation of the focusing actuator and eventually hindering the focusing servo operation, even in a situation where such hindrance is not likely to occur. Such mutual interference of the light spots can be prevented by an expansion of the distances of the light spots, but such expansion is limited by another condition as explained before. For these reasons, there have remained certain problems to be solved, relating to the focusing control of the light spots.

SUMMARY OF THE INVENTION

In consideration of the foregoing, an object of the present invention is to provide an optical information record/reproducing apparatus in which light sources for producing light spots are turned off, except for that spot detecting a focusing error signal, until the completion of the focusing pull-in operation, thereby preventing interference from other light spots and enabling a stable focusing pull-in operation to be performed.

Another object of the present invention is to provide an optical information record/reproducing apparatus which, in case of an external disturbance such as a shock or a vibration, turns off light sources except for a light source generating a light spot for detecting the focusing error signal, thereby achieving prompt restoration from the defocus state and enabling stabilized operation of the apparatus.

The above-mentioned objects can be attained, according to the present invention, by an optical information record/reproducing apparatus which has at least two light-emitting points, which focuses the light beams emitted from said light-emitting points as small spots on an optical information recording medium, and utilizes which at least one of the light spots for detecting a focusing servo error signal. The apparatus comprises a light source, such as a semiconductor laser array having at least two light-emitting parts in a chip. The light sources for the light spots are turned off, except for the light spot for detecting the focusing error signal, until the completion of the focus pull-in operation of the focusing operation.

Also the objects can be attained, according to the present invention, by an optical information record/reproducing apparatus which has at least two light-emitting points, which focuses the light beams emitted from the light-emitting points as small spots on an optical information recording medium, and which utilizes at least one of the light spots for detecting a focusing servo error signal. The apparatus comprises a light source, such as a semiconductor laser array having at least two light-emitting parts in a chip. If an external disturbance such as a shock or a vibration is applied, the light sources for the light spots are turned off except for the light spot for detecting the focusing servo error signal.

DESCRIPTION OF THE PREFERRED EMBODIMENTS

Figure 1:
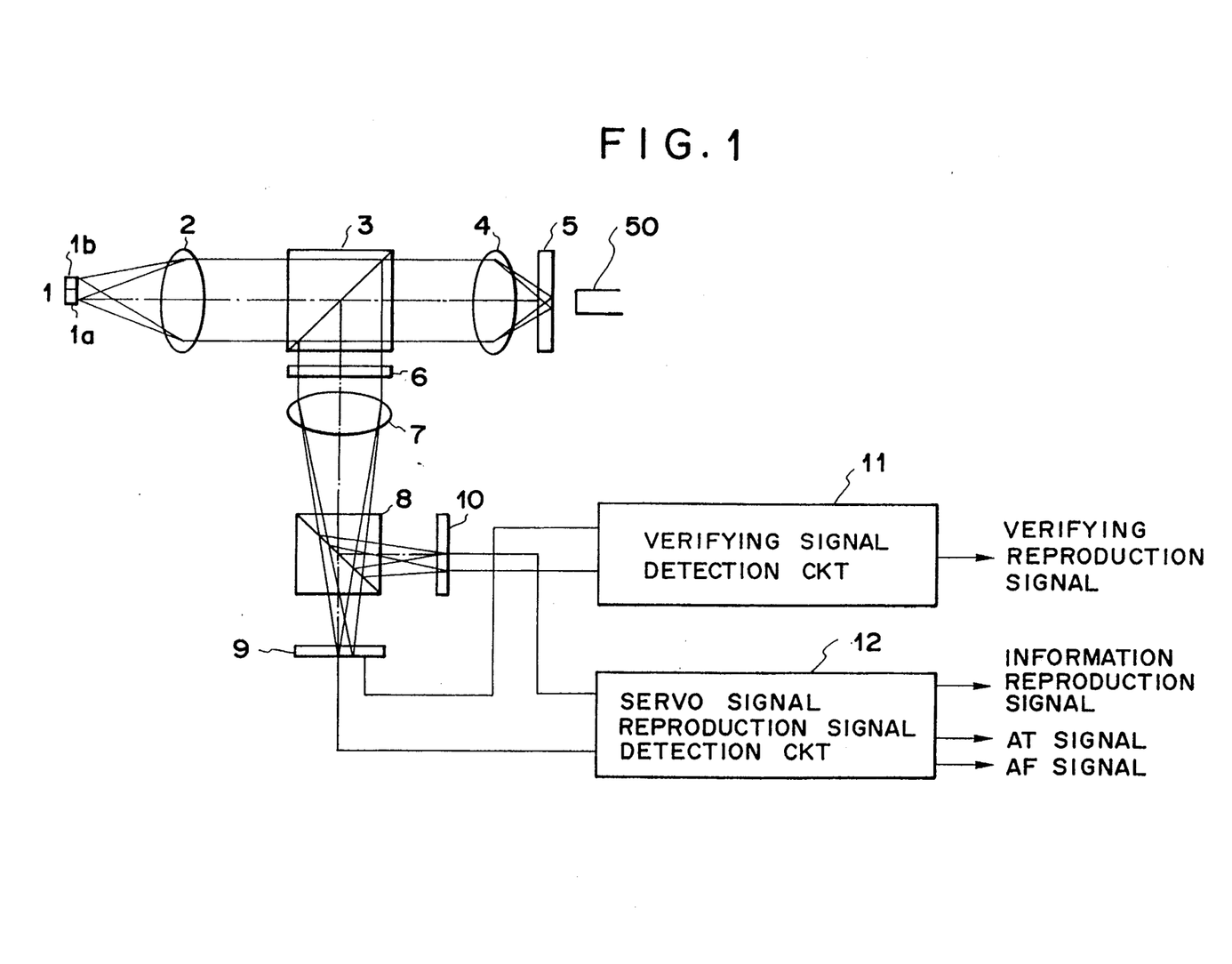
FIG. 1 is a schematic view of an embodiment of the optical information record/reproducing apparatus of the present invention.

In the following there will be given a detailed explanation, with reference to the attached drawings, on a first embodiment of the present invention. FIG. 1 is a schematic view of an embodiment of the optical information record/reproducing apparatus of the present invention. A semiconductor laser diode array 1 constitutes a light source for recording and reproduction, and has two light-emitting parts 1a, 1b. The light beam from the semiconductor laser 1a is used for information recording, while that from the semiconductor laser 1b is used for verification by reproducing the recorded information. There are also provided a collimating lens 2 to be commonly used for converting the diverging light beams from the light-emitting parts 1a, 1b into parallel light beams; a polarizing beam splitter 3 for separating the reflected light beams from the recording medium, from the incident light beams; an objective lens 4 for focusing the light beams into small light spots; and a magnetooptical disk 5 constituting the information recording medium. The light beams from the light-emitting parts 1a, 1b of the semiconductor laser are converted into parallel light beams by the collimating lens 2, are then transmitted by the polarizing beam splitter 3, and are focused by the objective lens 4 to form two light spots on the magnetooptical disk 5. On an information track of the magnetooptical disk 5, the light spot of the semiconductor laser 1a is formed in a preceding position, and that of the semiconductor laser 1b is formed with a certain distance therebehind.

There are further provided a ½-wavelength plate 6; a toric condenser lens 7; a polarizing beam splitter 8; and photodetectors 9, 10. These optical elements constitute a detection optical system for detecting a reproduction signal and a servo signal, based on the light reflected from the magnetooptical disk 5, and the detection optical system is used in common for the reproduction signal and for the servo signal. The light beam reflected from the magnetooptical disk 5 is guided again through the objective lens 4, then reflected by the polarizing beam splitter 3, transmitted by the ½-wavelength plate 6, condensed by the toric condenser lens 7, and introduced to the polarizing beam splitter 8, which separates the incident light beam into two beams according to the polarizing directions. Thus separated light beams are respectively detected by the photodetectors 9, 10. A verifying signal detection circuit 11 reproduces a verifying signal, based on the detection signals from the detectors 9, 10, while a servo signal/reproduction signal detection circuit 12 detects a focusing error signal and a tracking error signal for the focusing control and the tracking control, based on the detection signals of the detectors 9, 10, and also reproduces information in the normal reproducing operation. The obtained servo error signals are supplied to a focusing actuator and a tracking actuator for driving the objective lens 4 respectively in the focusing direction and in the tracking direction, whereby the focusing control and the tracking control of the two light spots formed by the semiconductor lasers 1a, 1b are achieved by the position control of the objective lens 4 based on the servo error signals. At the recording operation, a magnetic field, modulated according to the information signal to be recorded, is applied by a magnetic head 50 to the light irradiating portion of the magnetooptical disk 5.

Figure 2:
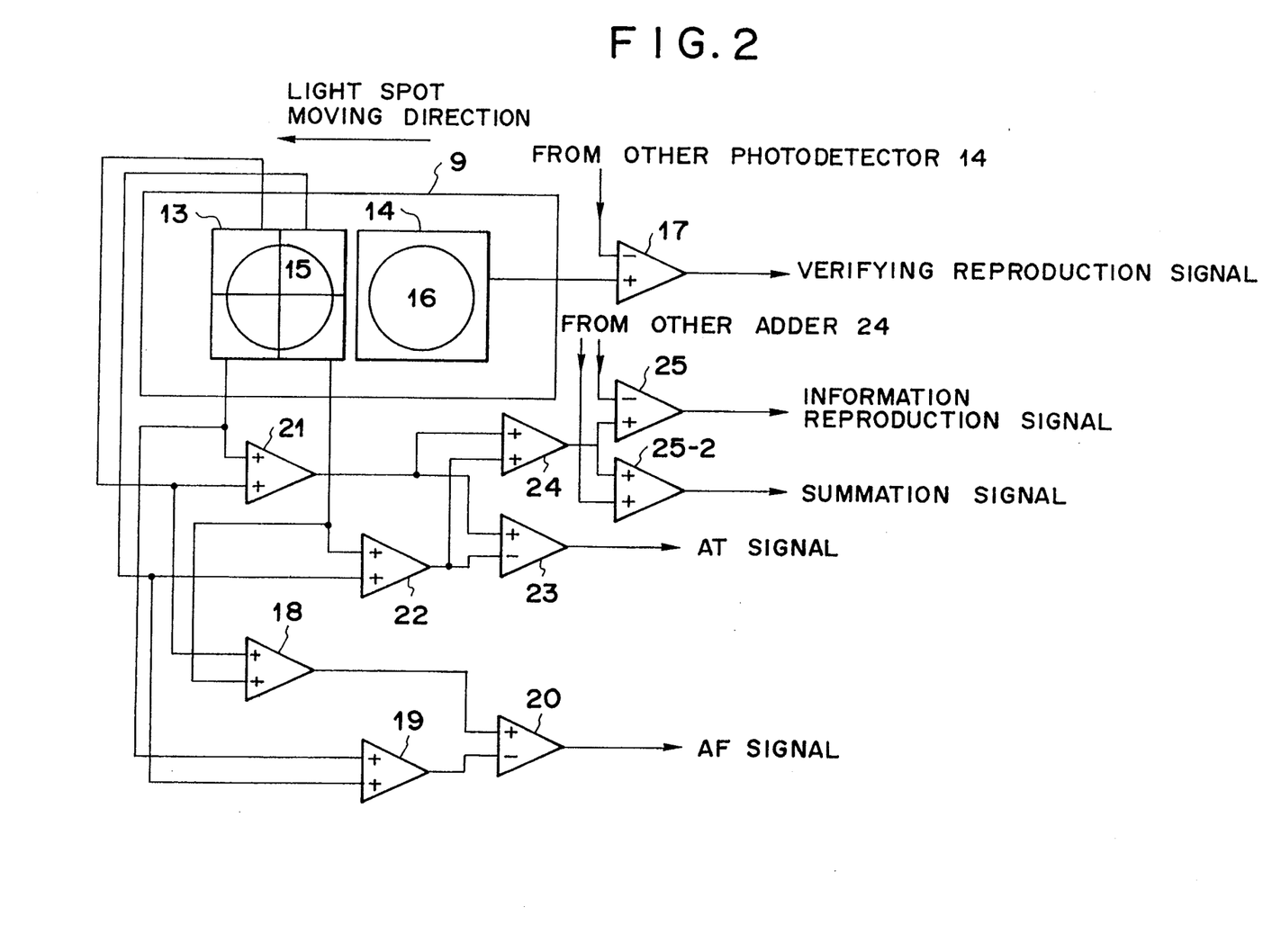
FIG. 2 is a view showing photodetectors of the embodiment shown in FIG. 1, light spots projected thereon, and an example of the verifying signal detection circuit and the servo signal/reproduction signal detection circuit.

FIG. 2 shows the details of the photodetectors shown in FIG. 1, the verifying signal detection circuit 11 and the servo signal/reproduction signal detection circuit 12. FIG. 2 only shows the photodetector 9, but the other photodetector 10 has an identical structure. The photodetector 9 is composed of a divided photodetector 13 where detecting surface is divided into four areas by crossing lines, and an ordinary photodetector 14. On the divided photodetector 13 and the photodetector 14, there are respectively projected a light spot 15 coming from the semiconductor laser 1a and reflected by the magnetooptical disk 5, and a light spot 16 coming from the semiconductor laser 1b and reflected by the disk 5. In FIG. 2 there are shown light spots when the objective lens 4 is rendered in an in-focus state with respect to the magnetooptical disk 5.

The detection signal of the photodetector 14 is supplied to a differential amplifier 17 and is subjected to differential detection with the detection signal from the other photodetector 10, thereby reproducing a signal for verification. In the divided photodetector 13, the detection signals from the diagonally positioned detecting areas are respectively added in adders 18, 19, and the obtained summation signals are subjected to differential detection in a differential amplifier 20 to obtain a focusing error signal (AF signal). The focusing error signal is supplied to the unrepresented focusing actuator for focusing control of the objective lens 4 in so-called astigmatism method. Also in the divided photodetector 13, the detection signals from the detecting areas which are adjacent in a direction perpendicular to the track are respectively added in adders 21, 22, and the obtained summation signals are subjected to differential detection in a differential amplifier 23 to obtain a tracking error signal (AT signal). The tracking error signal is supplied to the unrepresented tracking actuator for tracking control of the objective lens 4 in so-called push-pull method. Also the summation signals from the adders 21, 22 are further added in an adder 24 to obtain a total summation signal of the divided photodetector 13. The summation signal from the adder 24 is subjected to differential detection, in a differential amplifier 25, with the total summation signal of the other divided photodetector 10, thereby providing a reproduction signal in the ordinary information reproduction. Furthermore, the summation signal from the adder 24 is added with the total summation signal of the other divided photosensor 10 in an adder 25-2, thereby generating a summation signal to be utilized in the focusing pull-in operation.

In the following there will be explained the function of the present embodiment, with reference to a flow chart shown in FIG. 3. The focusing pull-in sequence of the present invention shown in FIG. 3 is applicable to the AF signal detection of astigmatism method shown in FIGS. 1, 2 and 4, or that of differential beam size method shown in FIGS. 5 to 7.

Figure 3:
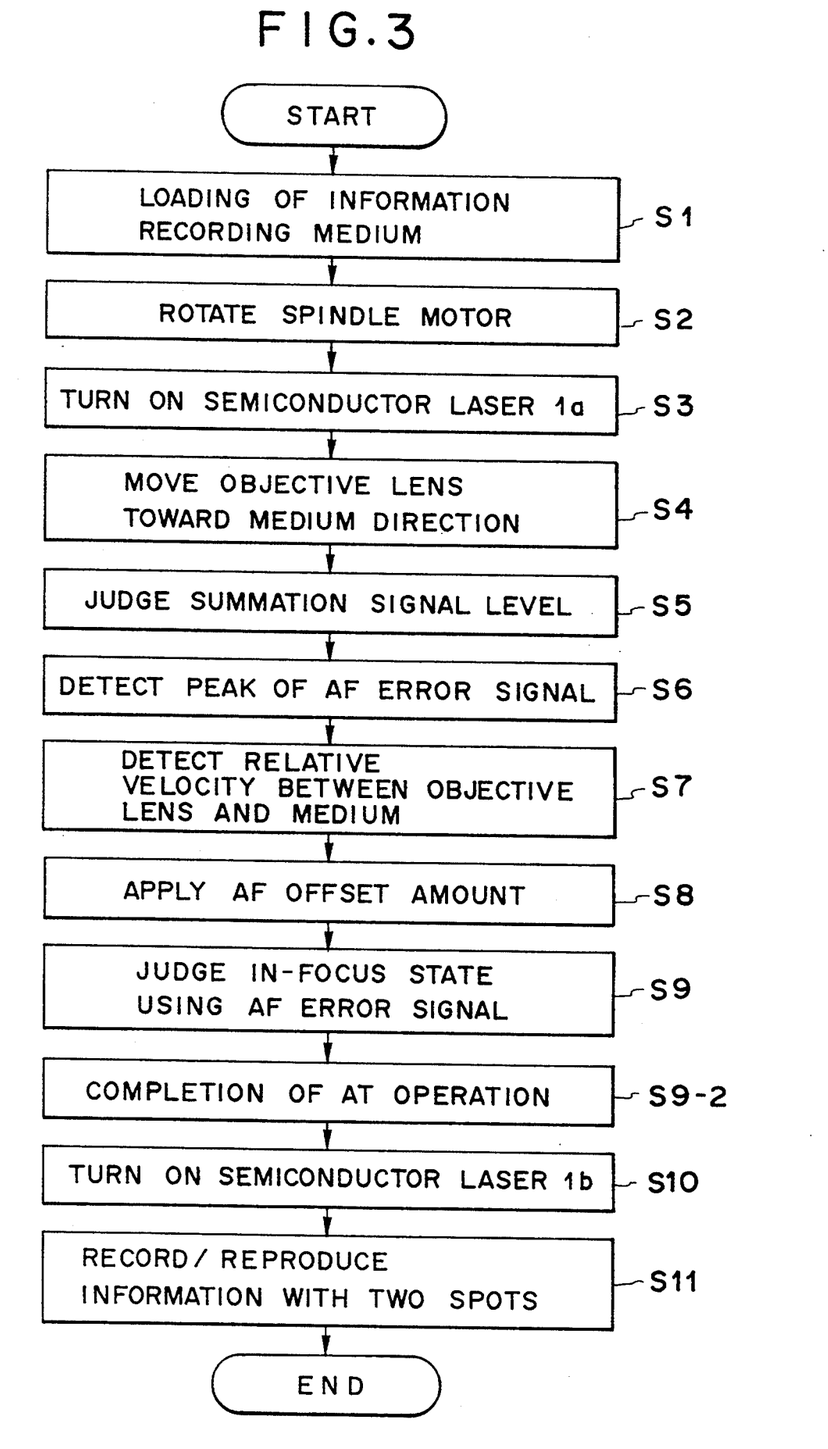
FIG. 3 is a flow chart showing the procedure of a focus pull-in operation in the embodiment shown in FIG. 1.

Referring to FIG. 3, when the magnetooptical disk 5 is loaded by an unrepresented disk loading mechanism to a predetermined position with respect to the objective lens 4 (S1), an unrepresented control unit sends a control signal to an unrepresented spindle motor, thereby rotating the magnetooptical disk 5 with a constant angular velocity (S2). Then the control unit controls an unrepresented semiconductor laser driver, thereby turning on the semiconductor laser 1a (S3). The light spot formed by the semiconductor laser 1a is used for detecting the focusing error signal, as explained before.

Figure 4:
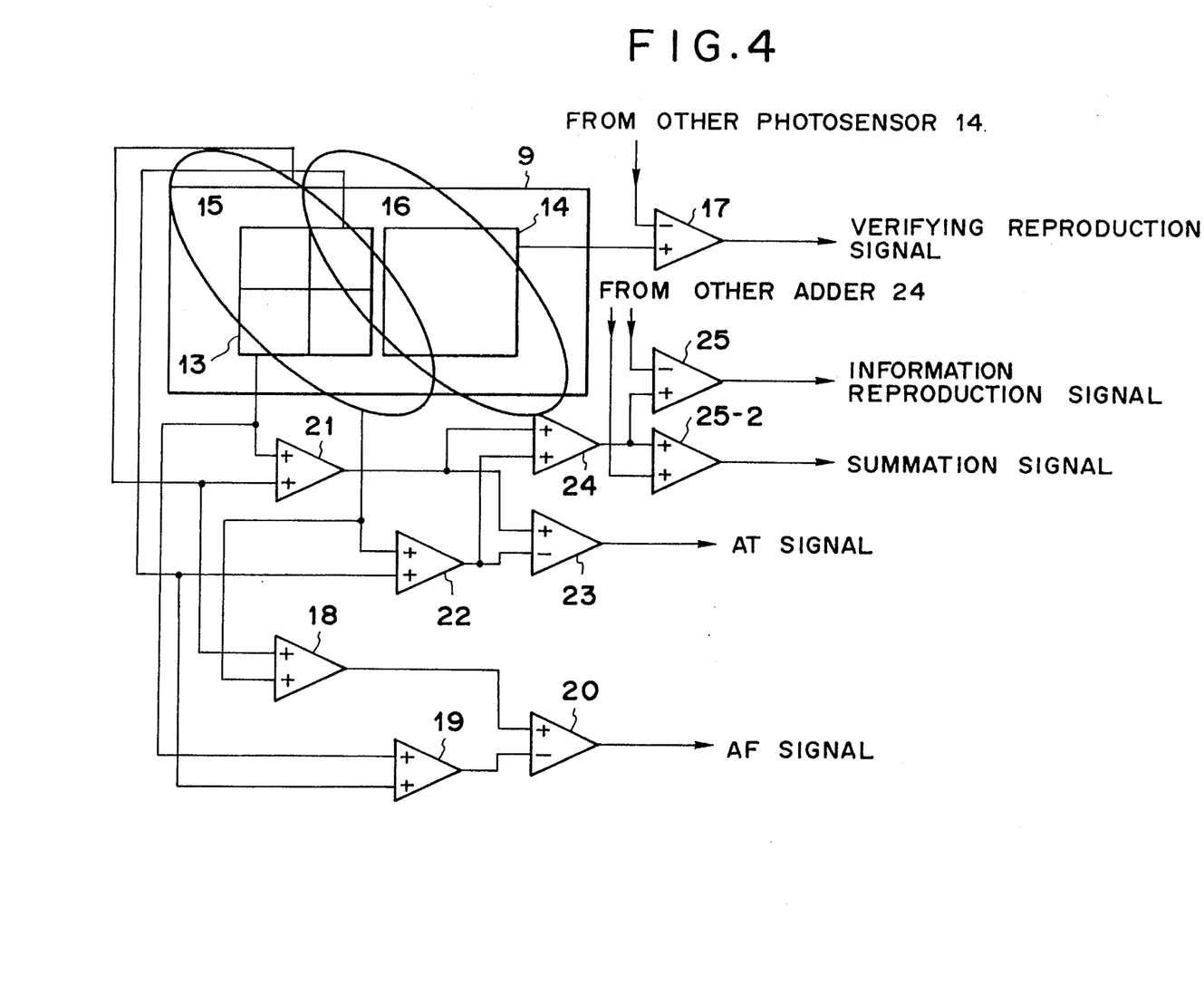
FIG. 4 is a view showing light spots on the photodetectors in a defocused state in the course of the focus pull-in operation in the embodiment shown in FIG. 1.
Figure 7:
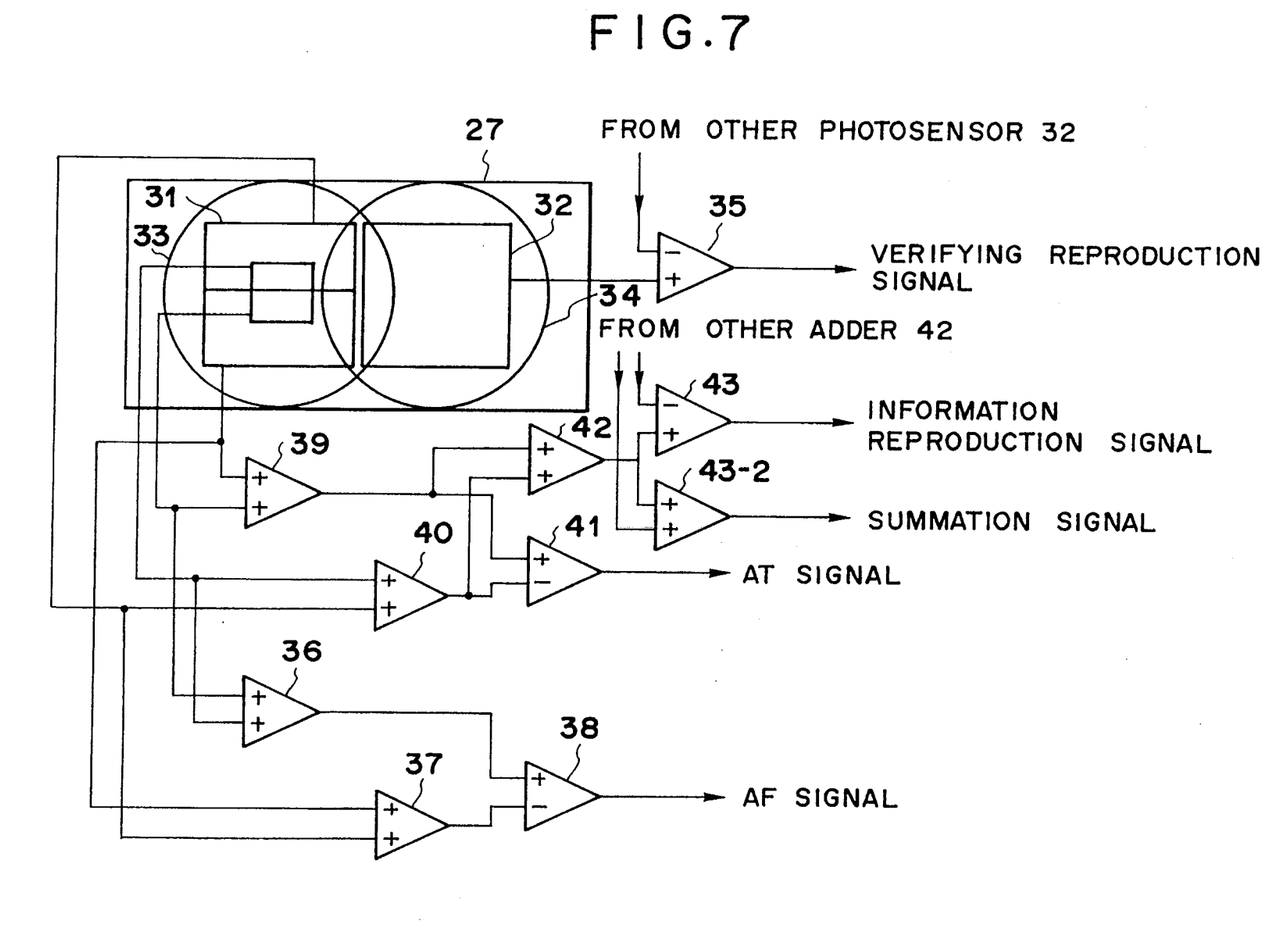
FIG. 7 is a view showing light spots on the photodetectors, in the embodiment shown in FIG. 5, in a defocused state in the course of the focus pull-in operation.

In this state, the objective lens 4 remains still in a position farther from the in-focus position to the disk 5, for example by gravity or by an elastic force of support means in a driving unit for the objective lens 4. Then, the unrepresented control unit sends a signal to a driving unit for driving the objective lens 4 in the substantially axial direction, thereby gradually moving the objective lens 4 in a direction approaching the disk 5 (S4). Since the servo signal detecting light beam 15 is significantly defocused on the photodetector 13, in the transient state of this pull-in operation, the light beam 15 in the astigmatism method overflows to the adjacent photodetector 14 for detecting the verifying signal, as shown in FIG. 4. Also in the differential beam size method, in the transient state of the pull-in operation as shown in FIG. 7, the light beam 33 overflows to the adjacent photodetector 32 for detecting the verifying signal. According to the present embodiment, however, the light beam 16 is not present on the photodetector 14 shown in FIG. 4, because the semiconductor laser 1b for forming the verifying light spot is not turned on in this state. Also, in case of the differential beam size method, the light beam 33 shown in FIG. 7 is not present according to the present invention. While the objective lens 4 is driven as explained before, the level of the summation signal is inspected by the signal from the adder 25-2, and the focused point of the light spot is identified to be within a predetermined range in the vicinity of the recording surface of the disk 5 when said signal exceeds a certain predetermined level (S5). Then the peak of the AF error signal is detected (S6), then the relative velocity between the objective lens 4 and the disk 5 is determined (S7), and a predetermined offset of the AF error signal is added, according to thus determined relative velocity, to the focusing actuator for a predetermined period (S8), and an AF servo loop switch is turned on to activate the ordinary focusing servo operation, when the distance between the objective lens and the information recording surface of the disk 5 reaches a predetermined range, based on the AF signal (S9).

After the pull-in operation is completed in this manner, the control unit instructs the semiconductor laser drive to turn on the semiconductor laser 1b for verification (S10).

Thereafter the pull-in operation for the tracking is conducted, whereby the two light spots formed by the semiconductor lasers 1a, 1b are rendered capable of information recording and reproduction on an information track. Then, in response to a record/reproducing command from the control unit, there is conducted a record/reproducing operation utilizing the two light spots (S11).

In the above-explained pull-in procedure, the step S6 may also be replaced by operations of driving the objective lens 4 toward the disk 5 from a farther position, as explained above, while inspecting the AF signal, and turning on the AF servo loop switch at a zero-cross point of the AF signal after reaching a maximum point.

The semiconductor laser 1b may be turned on after the pull-in operations for focusing and tracking are completed. In case a recording command is given, the control unit sets the semiconductor lasers 1a, 1b respectively at a recording power and a reproducing power, and controls an unrepresented seeking mechanism to move the two light spots to an instructed information track, whereby the desired information track is irradiated by a recording light spot, formed by the semiconductor laser 1a, in a preceding position, and by a verifying light spot, formed by the semiconductor laser 1b, in an immediately succeeding position separated by a predetermined distance. On the other hand, the magnetic head 50 applies a magnetic field, modulated according to the information signal to be recorded, to the irradiating position of the light spot on the magnetooptical disk 5, whereby the information is serially recorded on the information track, by the scanning motion of the light spot. The two light spots are naturally subjected to focusing control and tracking control, utilizing the focusing error signal and the tracking error signal obtained from the detection signal of the four-divided photodetector 13, as already explained with reference to FIG. 2, whereby the two light spots are maintained in the focused state while scanning the information track. Simultaneous with the information recording, the information recorded by the preceding light spot is reproduced, on real-time basis, by the differential amplifier 17. The obtained verifying reproduction signal is supplied to an unrepresented signal processing circuit for binarization, decoding etc. to obtain reproduced data. The obtained reproduced data are compared with the recording data in an unrepresneted verification judging circuit, and a direct verification simultaneous with the recording is thus achieved.

On the other hand, in case of reproducing the information, the semiconductor lasers 1a, 1b are set at a reproducing power, and the light spots are positioned on and scan an instructed information track. The semiconductor laser 1b may be turned off, since the light spot to be formed by the laser 1b thereby is not used in the reproduction of information. Also in such reproducing operation, there are executed servo controls based on the focusing error signal and the tracking error signal, obtained from the detection signals of the four-divided photodetector 13, in the same manner as in the recording operation. The reproducing light spot scans the desired information track as explained above, and the reproduction signal is released in Succession from the differential amplifier 25 by the scanning motion. The obtained signal is restored into the original reproduction data by the signal processing circuit, and is transferred to an upper controlling apparatus.

As explained in the foregoing, the present embodiment turns off the semiconductor lasers for forming the light spots, except for the one for forming a light spot for detecting the focusing error signal, until the pull-in operation is completed for focusing, thereby avoiding the drawback of the overflow of the defocused light spot into the adjacent photodetector portions, leading to the interference with the signals generated by the photodetector portions. Consequently the focusing pull-in operation can be executed in stable manner.

Figure 5:
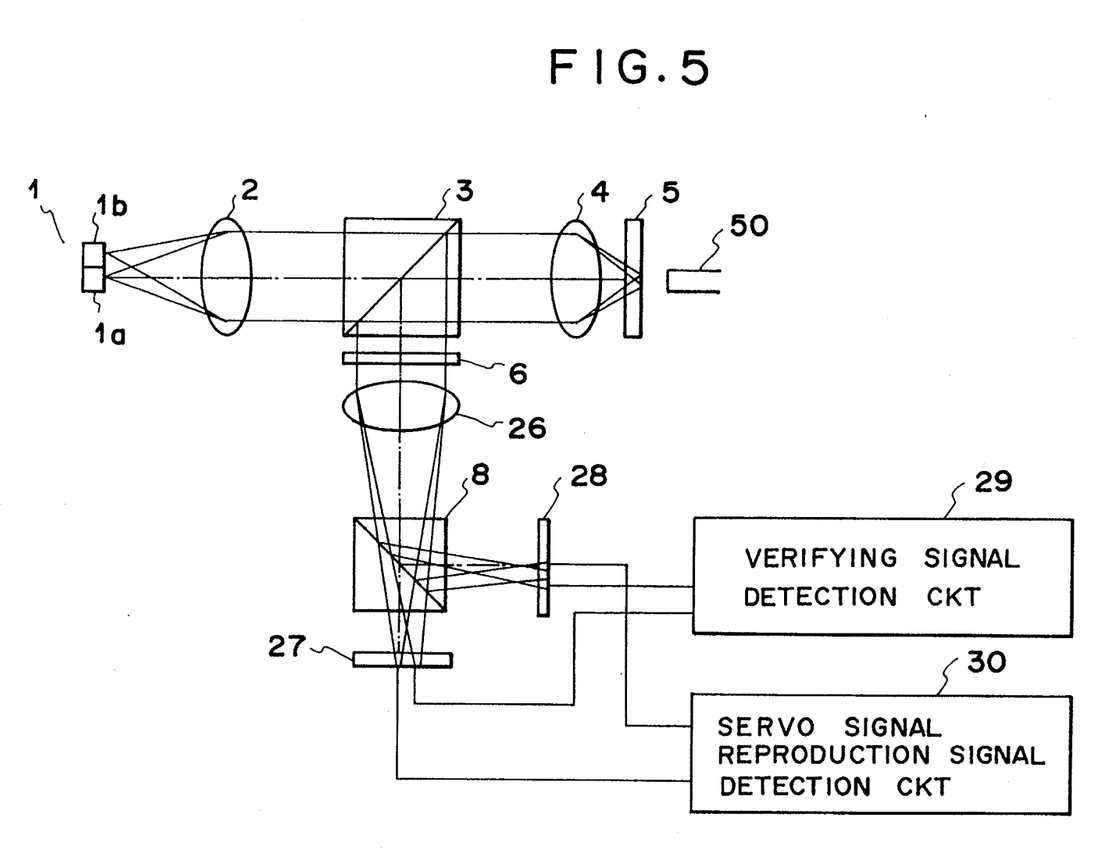
FIG. 5 is a view of an optical information record/reproducing apparatus employing the beam size method for the detection of the focusing error signal and the push-pull method for the detection of the tracking error signal.

FIG. 5 is a schematic view of an optical information record/reproducing apparatus employing the beam size method for the detection of the focusing error signal, and the push-pull method for the detection of the tracking error signal. In FIG. 5, the same components as those in FIG. 1 are represented by the same reference numerals. In FIG. 5, there are provided a condenser lens 26; a photodetector 27, composed of two photodetectors as will be explained later; a verifying signal detection circuit 29 for detecting the verifying signal, based on the detection signals of the photodetectors 27, 28; and a servo signal/reproduction signal detection circuit 30 for detecting the focusing error signal, the tracking error signal and the reproduction signal in the ordinary reproducing operation. Also in this embodiment, in the information recording operation, the light beam of the semiconductor laser 1a of the laser diode array 1 irradiates a preceding position on an information track of the magnetooptical disk 5, and the light beam of the semiconductor laser 1b irradiates an immediately succeeding position, for verification.

Figure 6:
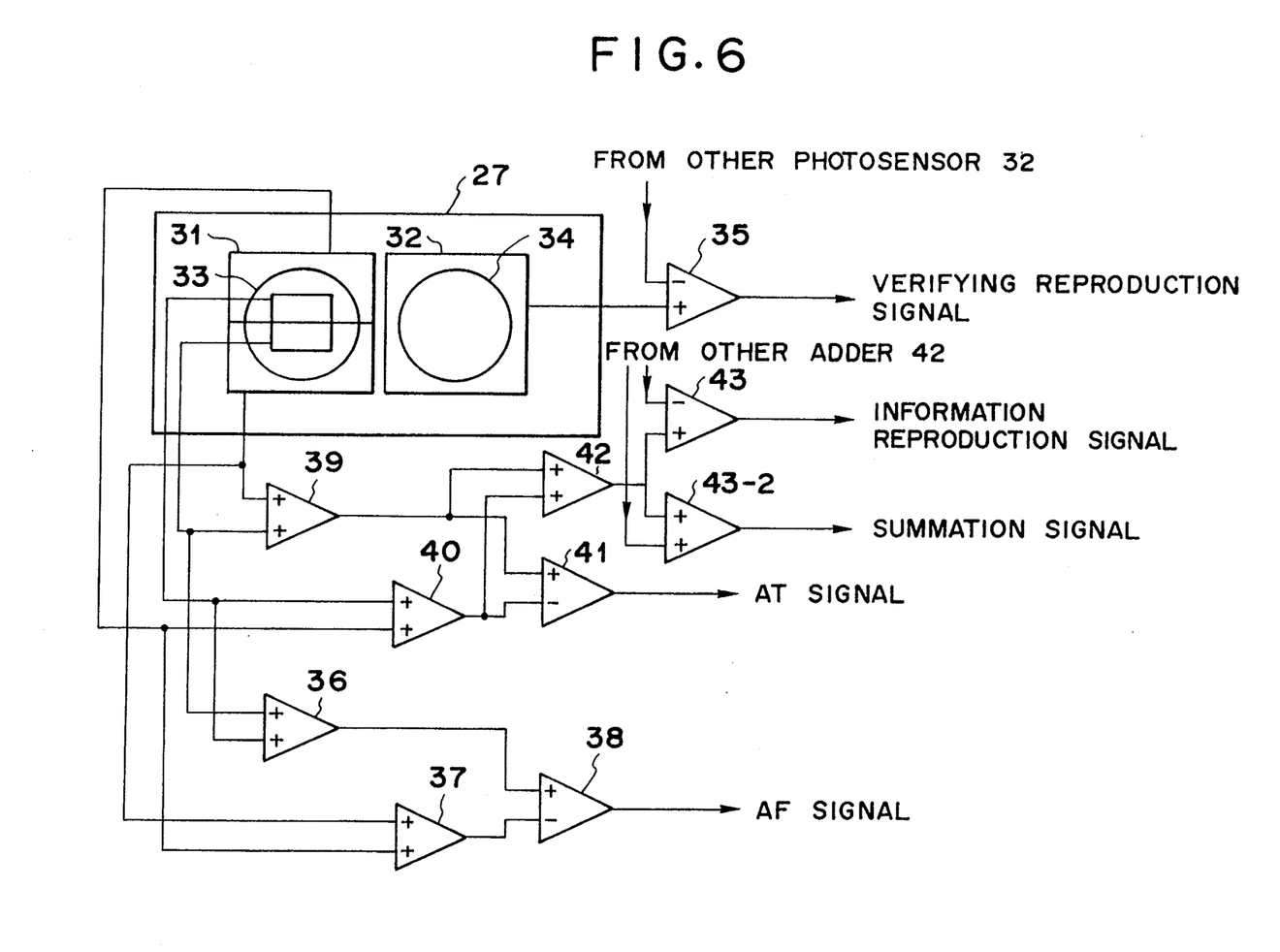
FIG. 6 is a view showing photodetectors in the embodiment shown in FIG. 5, light spots projected thereon, and an example of the verifying signal detection circuit and the servo signal/reproduction signal detection circuit.

FIG. 6 shows the details of the photodetector 27, the verifying signal detection circuit 29, and the servo signal/reproduction signal detection circuit 30. FIG. 6 only shows the photodetector 27, but the other photodetector 28 is identical with the detector 27. The photodetector 27 is composed of two photodetectors 31, 32. The photodetector 31 is divided into two areas by a central line, and is further divided into two along the direction of information tracks. The other photodetector 32 is an ordinary one without division. Light spots 33, 34 respectively projected on the photodetectors 31, 32 are respectively formed by the semiconductor lasers 1a, 1b. FIG. 5 illustrates the light spots when the objective lens 4 is rendered in an in-focus state with respect to the magnetooptical disk 5.

The detection signal of the photodetector 32 is subjected to differential detection in a differential amplifier 35, with the detection signal of the other photodetector 28, thereby providing a verifying signal at the information recording operation. Signals detected in the inner and outer detecting areas of the photodetector 31 are subjected to differential detection by a differential amplifier 38 to obtain a focusing error signal of a so-called beam size method. Also signals detected in the detecting areas of the detector 31 divided in the direction of the information track are subjected to differential detection in a differential amplifier 41, to obtain a tracking error signal of the push-pull method. Furthermore signals from the detection areas of the photodetector 31 are added in an adder 42, and the obtained summation signal is subjected to differential detection, in a differential amplifier, with the signal from the photodetector 28, to provide reproduction signal in the ordinary reproducing operation. Furthermore the summation signal from the adder 42 is added, in an adder 43-2, with the total summation signal from the other photodetector 28, thereby providing a summation signal to be employed in the focus pull-in operation.

Also in this embodiment, in the focusing pull-in operation, the semiconductor lasers 1a, 1b are controlled according to the flow chart shown in FIG. 3. More specifically, the focusing pull-in operation is conducted by turning on the semiconductor laser 1a at first, while the light sources other than that for forming the light spot for detecting the focusing error signal are turned off until the completion of the operation. In the course of the focusing pull-in operation, the light spot on the photodetector 27 is enlarged as shown in FIG. 7, thus overflowing into the adjacent photodetector, but the focusing pull-in operation can be executed in stable manner without mutual interference of the light spots, because unnecessary light sources are turned off.

Figure 8:
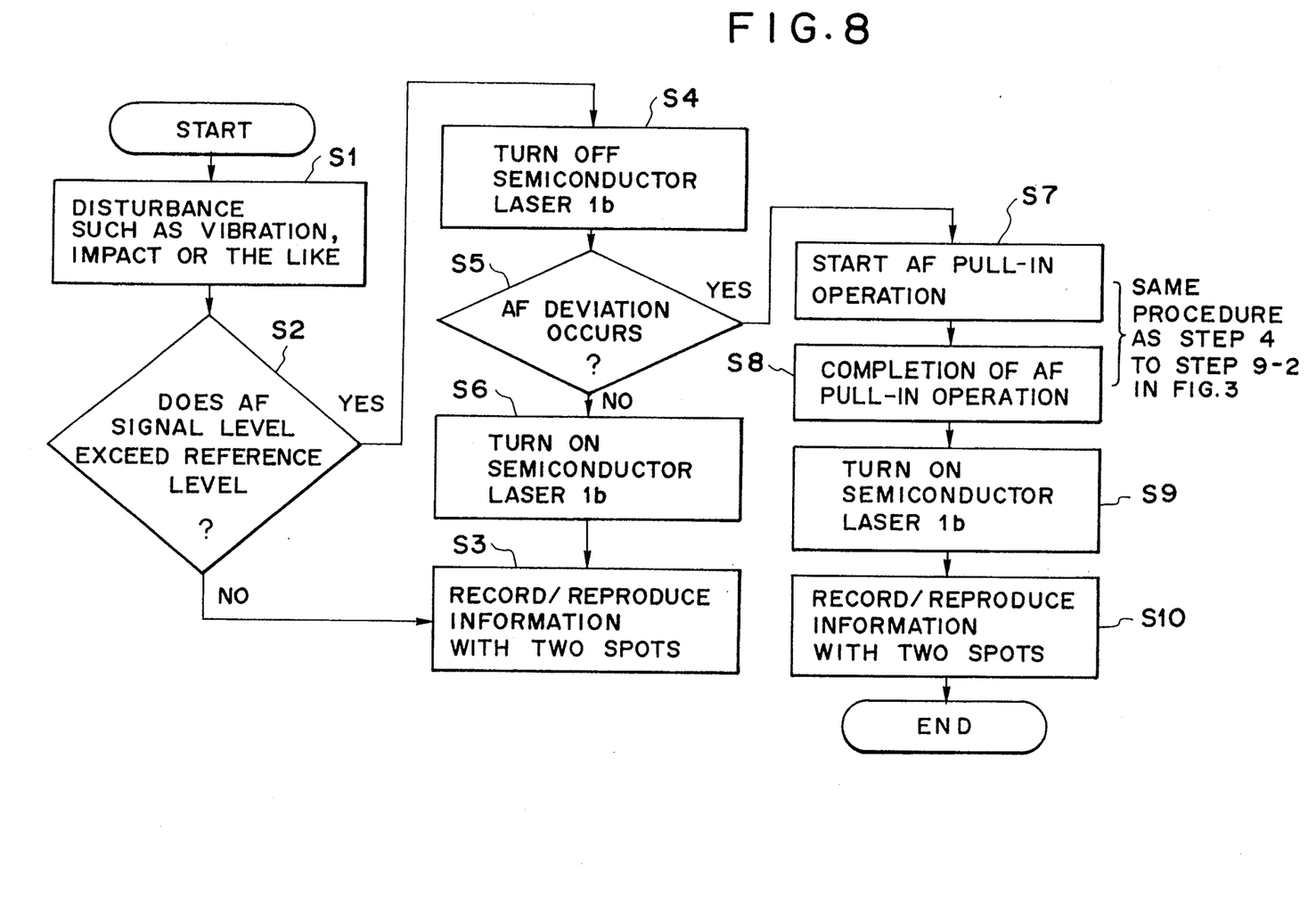
FIG. 8 is a flow chart showing another embodiment of the present invention.

In the following there will be explained another embodiment of the present invention, with reference to FIG. 8. In the foregoing embodiments, the light sources are turned off, except for the one for forming the light spot for detecting the focusing error signal, until the completion of the focusing pull-in operation. In this embodiment, if a shock or a vibration is applied to the apparatus in the course of the operation thereof, the light sources for the light spots are turned off, except for the one for forming a light spot for detecting the focusing error signal. This embodiment is applicable to the optical information record/reproducing apparatus shown in FIG. 1 or 5. Referring to FIG. 8, during the operation of the apparatus, an unrepresented control unit constantly detects the level of the focusing error signal and judges whether the detected level exceeds a predetermined reference level. When an external disturbance such as impact or vibration is applied (S1), there occurs a variation in this level. Thus this level is compared with the level of a reference signal, and, based on the result of the comparison, there is discriminated whether an out-of-focus state has been generated (S2). If the level of the focusing error signal does not exceed the reference level, the focus state is identified as normal, and the recording or reproducing operation with two light spots is continued without change (S3).

On the other hand, if the level of the focusing error signal exceeds the reference level, an out-of-focus state is identified, and the semiconductor laser 1b, shown in FIGS. 1 and 5 and not used for the detection of the focusing error signal, is turned off (S4). Subsequently the recovery from such out-of-focus state is initiated by at first discriminating again the presence of the out-of-focus state, based on the level of the focusing error signal (S5). If the out-of-focus state is not present, the semiconductor laser 1b which has been turned off is turned on again (S6), and the recording or reproducing operation with two light spots is re-started (S3). If the out-of-focus state is present, the focusing pull-in operation is re-started (S7) in the same manner as shown in FIG. 3. More specifically, the semiconductor laser 1b, not used for the detection of the focusing error signal, is turned off, and, after the completion of the focusing pull-in operation (S8), the semiconductor laser 1b is turned on (S9). Thereafter the pull-in operation for the tracking servo control is conducted, and the recording and reproducing operations with two light spots are conducted (S10). The semiconductor laser 1b may be turned on after the tracking servo pull-in operation.

In the above-explained sequence, the out-of-focus state is detected by the level of the focus error signal, but such detection may also be achieved by the level of the summation signal. In this case, constant inspection is made as to whether the level of the summation signal exceeds a reference level. When the level of the summation signal becomes lower than the reference level, an out-of-focus state is identified. The subsequent procedure can be same as explained before.

In the present embodiment, as explained in the foregoing, even if a defocus state is induced by an external disturbance such as impact or vibration applied in the course of the operation of the apparatus, the light sources are turned off except for the one for forming the light spot for detecting the focusing error signal, thereby preventing a situation that the focusing actuator is erroneously activated by the interferences of the adjacent light spots, leading to an undesirable out-of-focus state. Consequently, in case of such external disturbance, the apparatus can be promptly restored from such a defocus state, and can therefore be operated in a stable state.

In the foregoing embodiments, a detection optical system is commonly used for detecting the servo signal and the reproduction signal, but there may be employed separate detection optical systems for these purposes.

Also in the foregoing embodiments, the preceding light spot is used for servo signal detection and information recording in the information recording operation, and for servo signal detection and information reproduction in the information reproducing operation, while the succeeding light spot is used for verification in the information recording operation but is turned off in the information reproducing operation, but it is also possible to use the preceding light spot for servo signal detection and information reproduction in the information recording operation, and for servo signal detection in the information reproducing operation, and to use the succeeding light spot for the verification in the information recording operation and for the reproduction of information in the information reproducing operation.

Furthermore, even in the above-mentioned latter case in which the verification and the reproduction of information are always effected by the succeeding light spot, the reproduction of the preformat header signal of the information recording medium alone may always be effected by the preceding light spot.

Also, the foregoing embodiments have been limited to an apparatus effecting direct verification by irradiating an information track with two light spots, but the present invention is naturally applicable also to an apparatus for effecting reproduction or recording in a parallel manner by irradiating plural information tracks with the light spots.

As explained in the foregoing, the use of a semiconductor laser diode array as plural light sources allows one to reduce the number of optical components and the number of points requiring adjustments and to employ a common optical system from the light sources to the photodetectors through the information recording medium, thereby realizing an apparatus resistant to the positional aberrations of the optical components. Also, such light sources allow one to reduce the distance of the light spots on the information recording medium so that, even on a disk-shaped recording medium in which the information tracks are formed by arcs of variable curvature, the amount of deviation, from the center of the track, of the light spot not subjected to the tracking servo operation among the plural light spots can be reduced.

These advantages of the semiconductor laser diode array can now be fully exploited, since the aforementioned drawbacks, resulting from the excessively close positioning of the detected light spots on the photodetector and having precluded the use of such laser diode array, are resolved by the present invention.

The present invention, featured by turning off the light sources except for the one for forming the light spot for detecting the focusing error signal until the completion of the focusing pull-in operation, provides the advantages of avoiding the overflow of the light of the adjacent light spot onto the photodetector for detecting the focusing error signal, thereby enabling the focusing pull-in operation to be performed in a stable manner.

Also, the present invention is featured by turning off the light sources except for the one for detecting the focusing error signal, in case of an external disturbance such as an impact or a vibration, thereby enabling prompt recovery from the defocused state and stabilizing the operation of the apparatus.

What is claimed is:

1. An optical information recording/reproducing apparatus comprising:
    a semiconductor laser having plural light emitting parts within a chip, said semiconductor laser generating a plurality of light beams for performing at least one of recording of information, reproduction of information, and detection of a focusing error signal to perform a focusing pull-in operation; and
    optical means arranged between said semiconductor laser and an information recording medium,
    wherein said semiconductor laser turns off the light emitting parts for generating the light beams other than the light beam for focusing error signal detection until the focusing pull-in operation is completed.

2. An optical information recording/reproducing apparatus comprising:
    a semiconductor laser having plural light-emitting parts within a chip, said semiconductor laser generating a plurality of light beams for performing at least one of recording of information, reproduction of information, and detection of a focusing error signal; and
    optical means arranged between said semiconductor laser and an information recording medium;
    wherein the light emitting parts for generating the light beams other than the light beam for focusing error signal detection are turned off when an external disturbance such as impact or vibration is applied to the apparatus.

3. A focusing pull-in method in an optical information recording/reproducing apparatus, comprising the steps of:
    employing a semiconductor laser having plural light-emitting parts within a chip and generating a light beam for performing detection of a focusing error signal to perform a focusing pull-in operation;
    turning off the light emitting parts of the semiconductor laser for generating light beams other than the light beam for focusing error signal detection at the time of said focusing pull-in operation; and
    generating a plurality of light beams by said semiconductor laser so as to perform at least one of recording of information, reproduction of information, and detection of the focusing error signal after completion of said focusing pull-in operation.

4. A focusing pull-in method in an optical information recording/reproducing apparatus, comprising steps of:
    employing a semiconductor laser having first and second light-emitting parts within a chip and turning on the first light-emitting part for performing detection of a focusing error signal so as to perform a focusing pull-in operation; and
    turning off the second light-emitting part at the time of said focusing pull-in operation; and turning on the first and second light-emitting parts so as to perform at least one of recording of information, reproduction of information, and detection of the focusing error signal after completion of said focusing pull-in operation.

5. A focusing pull-in method in an optical information recording/reproducing apparatus, comprising the steps of:
  employing a semiconductor laser having first and second light-emitting parts within a chip and turning on the first and second light-emitting parts for performing at least one of recording of information, reproduction of information, and detection of a focusing error signal to perform a focusing pull-in operation;
  when an external disturbance is applied to the apparatus, turning off the second light-emitting part and turning on the first light emitting part for performing detection of the focusing error signal so as to perform the focusing pull-in operation; and
  turning on the first and second light-emitting parts so as to perform at least one of recording of information, reproduction of information, and detection of the focusing error signal after completion of said focusing pull-in operation.

6. An optical information recording/reproducing apparatus comprising:
  a semiconductor laser having plural light-emitting parts within a chip, said semiconductor laser generating a plurality of light beams for performing at least one of recording of information on an information recording medium, reproduction of information from the recording medium, and detection of a focusing error signal; and
  detection means for detecting the focusing error signal from a light beam reflected from the recording medium,
  wherein when the focusing error signal detected by said detection means exceeds a predetermined level, said semiconductor laser turns off the light-emitting parts for generating the light beams other than the light beam for the focusing error signal detection.

7. A focusing pull-in method in an optical information recording/reproducing apparatus, comprising the steps of:
  employing a semiconductor laser having first and second light-emitting parts within a chip and turning on the first and second light-emitting parts so as to perform at least one of recording of information on an information recording medium, reproduction of information from the recording medium, and detection of a focusing error signal;
  when the focusing error signal detected by detecting means exceeds a predetermined level, turning off the second light-emitting part and turning on the first light-emitting part for performing detection of the focusing error signal so as to perform a focusing pull-in operation; and
  turning on the first and second light-emitting parts so as to perform at least one of recording of information, reproduction of information, and detection of the focusing error signal after completion of the focusing pull-in operation.

8. An optical information recording/reproducing apparatus comprising:
  light source means, having plural light emitting parts within a chip, for generating a plurality of light beams for performing at least one of recording of information, reproduction of information, and detection of a focusing error signal to perform a focusing pull-in operation; and
  optical means arranged between said light source means and an information recording medium,
  wherein said light source means turns off the light emitting parts for generating the light beams other than the light beam for focusing error signal detection until the focusing pull-in operation is completed.

9. An optical information recording/reproducing apparatus comprising:
  light source means, having plural light-emitting parts within a chip, for generating a plurality of light beams for performing at least one of recording of information, reproduction of information, and detection of a focusing error signal; and
  optical means arranged between said light source means and an information recording medium,
  wherein said light source means turns off the light emitting parts for generating the light beams other than the light beam for focusing error signal detection when an external disturbance is applied to the apparatus.

10. A focusing pull-in method in an optical information recording/reproducing apparatus, comprising the steps of:
  employing light source means, having plural light-emitting parts within a chip, and generating a light beam for focusing error signal detection of a focusing error signal to perform a focusing pull-in operation;
  turning off the light emitting parts of the light source means for generating light beams other than the light beam for focusing error signal detection at the time of the focusing pull-in operation; and
  generating a plurality of light beams by the light source means so as to perform at least one of recording of information, reproduction of information, and detection of the focusing error signal after completion of the focusing pull-in operation.

11. A focusing pull-in method in an optical information recording/reproducing apparatus, comprising steps of:
  employing light source means having first and second light-emitting parts within a chip and turning on the first light-emitting part for performing detection of a focusing error signal so as to perform a focusing pull-in operation;
  turning off the second light-emitting part at the time of the focusing pull-in operation; and
  turning on the first and second light-emitting parts so as to perform at least one of recording of information, reproduction of information, and detection of the focusing error signal after completion of the focusing pull-in operation.

12. A focusing pull-in method in an optical information recording/reproducing apparatus, comprising the steps of:
  employing light source means having first and second light-emitting parts within a chip and turning on the first and second light-emitting parts for performing at least one of recording of information, reproduction of information, and detection of a focusing error signal;
  when an external disturbance is applied to the apparatus, turning off the second light-emitting part and turning on the first light emitting part for performing detection of the focusing error signal so as to perform a focusing pull-in operation; and turning on the first and second light-emitting parts so as to perform at least one of recording of information, reproduction of information, and detection of the focusing error signal after completion of the focusing pull-in operation.

13. An optical information recording/reproducing apparatus comprising:

light source means, having plural light-emitting parts within a chip, for generating a plurality of light beams for performing at least one of recording of information on an information recording medium, reproduction of information from the recording medium, and detection of a focusing error signal; and detection means for detecting the focusing error signal from a light beam reflected from the recording medium, wherein when the focusing error signal detected by said detection means exceeds a predetermined level, said light source means turns off the light-emitting parts for generating the light beams other than the light beam for the focusing error signal detection.

14. A focusing pull-in method in an optical information recording/reproducing apparatus, comprising the steps of:

employing light source means having first and second light-emitting parts within a chip and turning on the first and second light-emitting parts so as to perform at lest one of recording of information, reproduction of information, and detection of a focusing error signal;

when the focusing error signal detected by detecting means exceeds a predetermined level, turning off the second light-emitting part and turning on the first light-emitting part for performing detection of the focusing error signal so as to perform a focusing pull-in operation; and turning on the first and second light-emitting parts so as to perform at least one of recording of information, reproduction of information, and detection of the focusing error signal after completion of the focusing pull-in operation.

15. A magnetooptical information recording/reproducing apparatus comprising:

an optical head having a plurality of light source units, said optical head irradiating an information recording medium with a plurality of light beams so as to perform at least one of recording of information, reproduction of information, and detection of a focusing error signal; and a magnetic head for applying a magnetic field to the recording medium, wherein said optical head turns off the light source units for generating the light beams other than the light beam for focusing error signal detection until a focusing pull-in operation is completed.

16. A magnetooptical information recording/reproducing apparatus comprising:

an optical head having a plurality of light source units, said optical head irradiating an information recording medium with a plurality of light beams so as to perform at least one of recording of information, reproduction of information, and detection of a focusing error signal; and a magnetic head for applying a magnetic field to the recording medium, wherein when an external disturbance is applied to the apparatus, said optical head turns off the light source units for generating the light beams other than the light beam for focusing error signal detection.

17. A magnetooptical information recording/reproducing apparatus comprising:

light source means, having plural light-emitting parts, for generating a plurality of light beams so as to perform at least one of recording of information on an information recording medium, reproduction of information from the recording medium, and detection of a focusing error signal;

magnetic field applying means for applying a magnetic field to the recording medium; and detection means for detecting a focusing error signal from a light beam reflected from the recording medium, wherein when the focusing error signal detected by said detection means exceeds a predetermined level, said light source means turns off the light emitting-parts for focusing error signal detection.

* * * * *

UNITED STATES PATENT AND TRADEMARK OFFICE
CERTIFICATE OF CORRECTION

PATENT NO. : 5,444,233   Page 1 of 3
DATED : August 22, 1995
INVENTOR(S) : KENICHI SASAKI It is certified that error appears in the above-indentified patent and that said Letters Patent is hereby corrected as shown below:

ON THE COVER PAGE

At [30], Foreign Application Priority Data insert: --Aug. 10, 1993 [JP] Japan...5-216930--.

COLUMN 2 line 24, "light" should read --lights--.
line 54, "independently" should read --independent--.
line 66, "limit the" should read --limit (the--.
line 67, "(light" should read --light--.

COLUMN 3 line 22, "direct" should read --the direct--.
line 26, "spot, if" should read --spot. If--.

COLUMN 6, line 19, "where" should read --whose--.

COLUMN 8, line 39, "unrepresneted" should read --unrepresented--.
line 56, "Succession" should read --succession--.

UNITED STATES PATENT AND TRADEMARK OFFICE
CERTIFICATE OF CORRECTION

PATENT NO. : 5,444,233
DATED : August 22, 1995
INVENTOR(S) : KENICHI SASAKI

It is certified that error appears in the above-indentified patent and that said Letters Patent is hereby corrected as shown below:

COLUMN 9 line 47, "Also" should read --Also,--.
    line 51, "Furthermore" should read --Furthermore,--.
    line 57, "Furthermore" should read --Furthermore,--.

COLUMN 10 line 26, "Thus" should read --Thus,--.
    line 38, "Subsequently" should read --Subsequently,--.
    line 52, "Thereafter" should read --Thereafter,--.

COLUMN 12 line 37, "medium;" should read --medium,--.

COLUMN 15 line 33, "lest" should read --least--.

UNITED STATES PATENT AND TRADEMARK OFFICE
CERTIFICATE OF CORRECTION

PATENT NO. : 5,444,233
DATED : August 22, 1995
INVENTOR(S) : KENICHI SASAKI

It is certified that error appears in the above-indentified patent and that said Letters Patent is hereby corrected as shown below:

<u>COLUMN 16</u> line 45, "light" should read --light- --.
    line 46, "emitting-parts" should read --emitting parts--.

Signed and Sealed this

Nineteenth Day of December, 1995

BRUCE LEHMAN

Attest:

Attesting Officer      Commissioner of Patents and Trademarks